United States Patent [19]

Hums

[11] Patent Number: 5,433,935
[45] Date of Patent: Jul. 18, 1995

[54] METHOD FOR REDUCING NITROGEN OXIDES IN FLUE GASES WITH AN ARSENIC RESISTANT CATALYST

[75] Inventor: Erich Hums, Bamberg, Germany

[73] Assignee: Siemens Aktiengesellschaft, Munich, Germany

[21] Appl. No.: 125,538

[22] Filed: Sep. 22, 1993

Related U.S. Application Data

[60] Division of Ser. No. 922,182, Jul. 30, 1992, Pat. No. 5,270,277, which is a continuation-in-part of Ser. No. 740,813, Aug. 6, 1991, abandoned.

[30] Foreign Application Priority Data

Aug. 8, 1990 [DE] Germany ............ 40 25 174.8
May 3, 1991 [EP] European Pat. Off. ........... 9107237

[51] Int. Cl.⁶ .................................. C01B 21/04
[52] U.S. Cl. .................................. 423/239.1
[58] Field of Search ............. 423/239.1; 502/309, 502/311

[56] References Cited

U.S. PATENT DOCUMENTS

| | | | |
|---|---|---|---|
| 4,851,381 | 7/1989 | Hums | 502/309 |
| 5,112,794 | 5/1992 | Hums et al. | 502/309 |
| 5,151,256 | 9/1992 | Kato et al. | 423/239 |

FOREIGN PATENT DOCUMENTS 0403879 12/1990 European Pat. Off. .
0470334 2/1992 European Pat. Off. .
4025174 2/1992 Germany .

OTHER PUBLICATIONS

Surface Technology, 9 (1979), El-Salaam et al, pp. 195–202 "Studies on the Heterogeneous Oxidation of 1-Butene " (no month).

*Primary Examiner*—Wayne Langel
*Assistant Examiner*—Thomas G. Dunn, Jr.
*Attorney, Agent, or Firm*—Herbert L. Lerner; Laurence A. Greenberg

[57] ABSTRACT

An arsenic-resistant composite oxide catalyst containing oxides of at least the metals vanadium and molybdenum, in particular for reducing nitrogen oxides in flue gases in the presence of a reducing agent, such as ammonia or carbon monoxide, includes at least one composite oxide phase with a general formula $V_xMo_yO_{32}$, where $x+y \leq 12$ and where $x \geq 1$ and $y \geq 1$, and optionally a $MoO_3$ phase. A method for producing an arsenic-resistant composite oxide catalyst includes mixing vanadium oxide and molybdenum oxide or a precursor thereof with one another to form a mixture, heating the mixture to a temperature at which a mixture of oxides is present, preferably in completely molten form, then cooling down the mixture to form at least one composite oxide phase with a general formula $V_xMo_yO_{32}$, and then subjecting the composite oxide phase to a reducing treatment to prepare a lower-oxygen composite oxide phase with the same structure.

6 Claims, 2 Drawing Sheets

5,433,935

METHOD FOR REDUCING NITROGEN OXIDES IN FLUE GASES WITH AN ARSENIC RESISTANT CATALYST

CROSS-REFERENCE TO RELATED APPLICATION

This application is a divisional of Ser. No. 07/922,182, filed Jul. 30, 1992; now U.S. Pat. No. 5,270,277, which is a continuation-in-part of copending application Ser. No. 740,813, filed Aug. 6, 1991, now abandoned.

BACKGROUND OF THE INVENTION

1. Field of the Invention

The invention relates to a catalyst containing oxides of at least the metals vanadium and molybdenum and a method of producing the same.

2. Description of the Related Art

Such catalysts have become increasingly important for reducing nitrogen oxides in flue gases in the presence of a reducing agent, among other purposes. To this end, the flue gases containing nitrogen oxides are enriched with a reducing agent, typically ammonia or carbon monoxide, and moved past the catalytically active surfaces. In this process, the nitrogen oxides are converted into nitrogen and water vapor, with simultaneous oxidation of the ammonia. Catalysts that contain oxides of one or more of the metals titanium, vanadium, molybdenum and tungsten are generally used for this purpose.

When such catalysts are used in flue gases containing nitrogen oxides, it has been found that they lose their catalytic activity over time. That decrease in catalytic activity proceeds faster with higher proportions of arsenic in the flue gases. When such catalysts are used in a flue gas flow upstream of a flue gas scrubber, particularly when ash recirculation into a melting chamber is provided, such catalysts deactivate especially quickly because of a process-dictated concentration of catalyst poisons, such as arsenous oxide.

In order to avert the decrease in catalytic activity as much as possible, various mixtures of catalytically active components have already been studied. However, it was only possible to slightly improve the course of deactivation.

SUMMARY OF THE INVENTION

It is accordingly an object of the invention to provide an arsenic-resistant composite oxide catalyst and a method for producing the same, which overcome the hereinafore-mentioned disadvantages of the heretofore-known methods and devices of this general type and which provide a way to make such catalysts resistant, in particular to the catalyst poison arsenous oxide.

With the foregoing and other objects in view there is provided, in accordance with the invention, an arsenic-resistant composite oxide catalyst containing oxides of at least the metals vanadium and molybdenum, in particular for reducing nitrogen oxides in flue gases in the presence of a reducing agent, such as ammonia or carbon monoxide, comprising at least one composite oxide phase having the general formula $V_xMo_yO_{32}$, where $x+y \leq 12$, $x \geq 1$ and $y \geq 1$, and optionally a $MoO_3$ phase.

A composite oxide catalyst of this kind is a multiple of times more arsenic-resistant than any other known catalysts, but a particular advantage is that its catalytic activity only decreases slightly even when it absorbs large quantities of arsenous oxide.

With the objects of the invention in view, there is also provided a method for producing an arsenic-resistant composite oxide catalyst, which comprises mixing vanadium oxide and molybdenum oxide or a precursor thereof with one another to form a mixture, heating the mixture to a temperature at which a mixture of oxides is present, preferably in completely molten form in accordance with a phase diagram, then cooling down the mixture to form at least one composite oxide phase with a general formula $V_xMo_yO_{32}$, where $x+y \leq 12$, $x \geq 1$ and $y \geq 1$, and then subjecting the composite oxide phase to a reducing treatment to prepare a lower-oxygen composite oxide phase being a reduced material of $V_xMo_yO_{32}$.

In accordance with another feature of the invention, the low-oxygen composite oxide phase is applied to a vehicle material. This makes it possible to adjust the surface area of the catalytically active phase in proportion to the flow cross section.

In accordance with a further feature of the invention, the reducing agent treated composite oxide phase $V_xMo_yO_{32}$ is applied to an oxidic support according to the complete catalyst that is able to develope a pore radius of over 200 angstrom units for more than 75% of the pores. Clearly, not only the particular catalytic properties of the vanadium-molybdenum composite oxide phase, but also the large pore radius, play a significant role in the finished catalyst. The large pore radius may possibly prevent the inner surface from becoming plugged with arsenous oxide.

In accordance with an added feature of the invention, titanium oxide, codierite, alumina or silica are used as the oxidic support. These substances are adequately temperature-proof, and due to the method steps described above, they produce the desired porous structure.

In accordance with an additional feature of the invention, it is very particularly advantageous if the molybdenum phase is likewise partly reduced. As a result, the molybdenum oxide can be prevented from forming a compound with the arsenous oxide of the flue gas which would, for instance, result in the compounds $As_4Mo_3O_{15}$ or $MoAs_2O_7$. At the same time, the undesirable conversion of $SO_2$ into $SO_3$ can also be lessened.

In accordance with yet another feature of the invention, in the manufacture of a composite oxide catalyst of this kind, it is particularly advantageous if the reducing agent-treated $V_xMo_yO_{32}$ composite oxide phase is mixed in the form of a powder with the oxidic support and is preferably calcined at 500° C. to 600° C. As a result, a distribution of pore radius can be achieved in which over 75% of all of the pore radii are over 200 angstroms.

In accordance with yet a further feature of the invention, it has proved to be particularly suitable if the starting materials of vanadium oxide and molybdenum oxide are mixed with one another in a ratio of 0.7:1. As a result of this mixture ratio, the two starting materials are present in a quantitative ratio that provides especially well for an enrichment of the desired precursor in the form of an oxygen-rich composite oxide phase $V_xMo_yO_{32}$, where $x+y \leq 12$, $x \geq 1$ and $y \geq 1$.

In accordance with yet an added feature of the invention, the melting process can be effected at temperature of substantially above 600° C., preferably in the range from 600° C. to over 800° C., and this temperature can be maintained for approximately half an hour. This assures that the entire substance mixture will melt together and is well mixed, so that when it cools down the desired $V_xMo_yO_{32}$ phase forms with the fewest possible $MoO_3$ and $V_2O_5$ domains.

Various possible procedures for the reducing treatment exist.

In accordance with yet an additional mode of the invention, the $V_xMo_yO_{32}$ phase can be cooled down ground after cooling to a particle diameter of less than 180 μm, and then subjected to a reducing treatment.

In this particular case, in accordance with again another mode of the invention, the $V_xMo_yO_{32}$ phase, ground down to a particle diameter of less than 180 μm can be subjected in a fixed bed to a reducing gas at 400° C. to 590° C.

Alternatively, in accordance with again a further mode of the invention, the $V_xMo_yO_{32}$ phase ground down to a particle diameter of less than 180 μm, can also be subjected to a fluidized-bed gas reduction with a reducing gas at 400° C. to 590° C.

In both of these last two cases, in accordance with again an added mode of the invention, arsenous oxide is suitable as a reducing agent for reducing the $V_xMo_yO_{32}$ phase.

Furthermore, in both of these last two cases, in accordance with again an additional mode of the invention, one or more of the reaction gases of the group including methane, carbon monoxide, hydrogen, hydrocarbons or aromatic compounds are especially advantageously suitable for reducing the $V_xMo_yO_{32}$ phase. Unlike the situation with arsenous oxide, the $MoO_3$ phase is reduced by these reducing agents as well. The result, among others, is a lower rate of the conversion of $SO_2$ to $SO_3$ later on.

Completely surprisingly, however, it is unnecessary to wait for the $V_xMo_yO_{32}$ phase to set before subjecting it to the reducing treatment. Instead, in accordance with still another, particularly suitable mode of the invention, the reducing treatment of the $V_xMo_yO_{32}$ phase can be performed at a temperature at which the mixture is in completely molten form in accordance with the phase diagram.

In accordance with still a further mode of the invention, the reducing treatment by gas reduction of the molten $V_xMo_yO_{32}$ phase in the presence of a reaction partner, such as arsenous oxide, methane, carbon monoxide, hydrogen and/or other hydrocarbons, can be performed at a temperature at which the mixture is in completely molten form in accordance with the phase diagram.

Finally, in accordance with still an added mode of the invention, it is possible to perform the reducing treatment by electroreduction of the $V_xMo_yO_{32}$ phase at temperatures at which the mixture is in completely molten form in accordance with the phase diagram.

In both of these last two cases, it is possible in accordance with a concomitant mode of the invention to grind the reducing agent-treated $V_xMo_yO_{32}$ phase obtained by the reducing treatment of the molten composite oxide $V_xMo_yO_{32}$ phase down to 180 μm after it has cooled down and before the admixture of the oxidic support. As a result, a material that is fine enough for calcination with the support being selected is obtained.

Other features which are considered as characteristic for the invention are set forth in the appended claims.

Although the invention is illustrated and described herein as embodied in an arsenic-resistant composite oxide catalyst and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
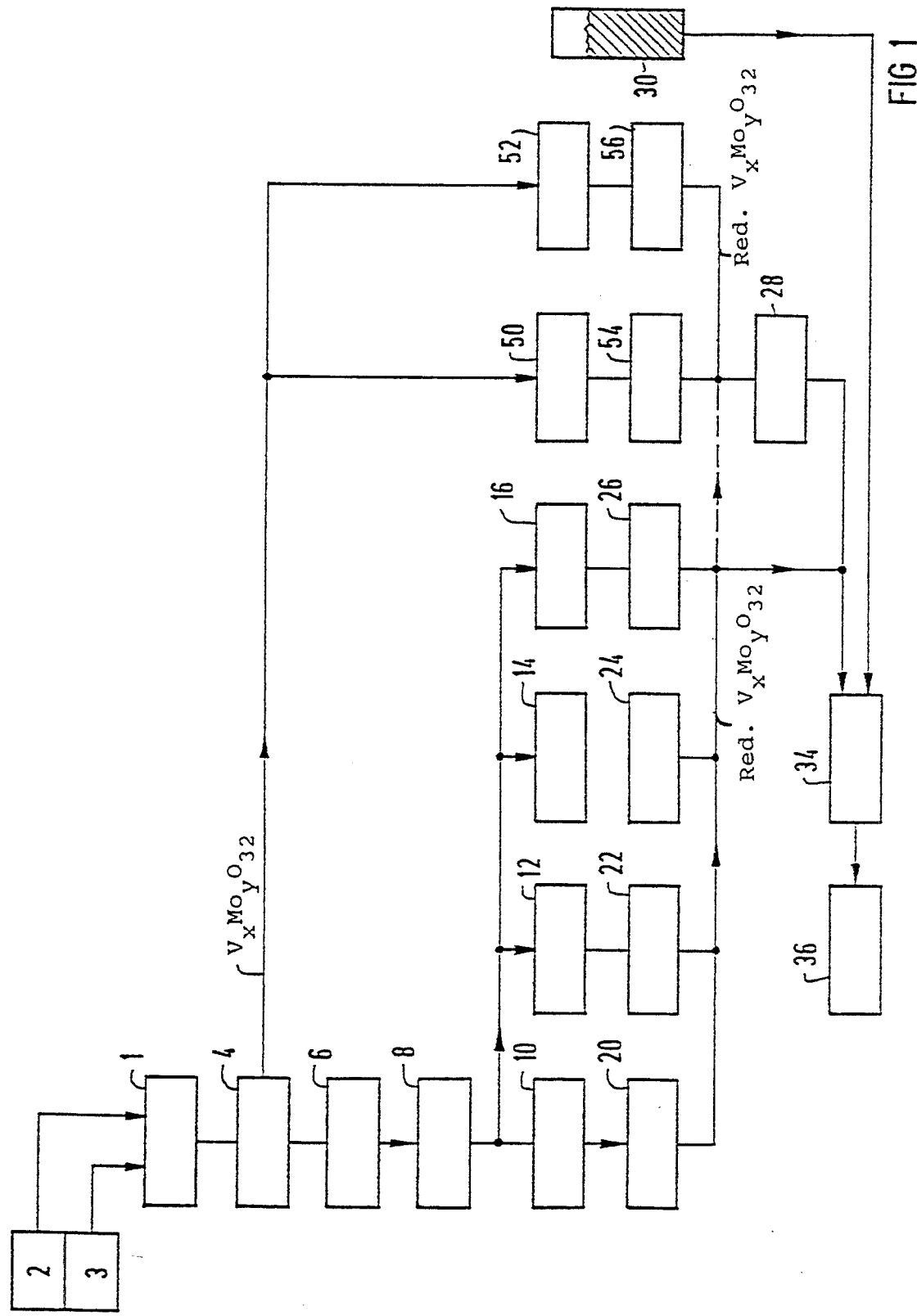
FIG. 1 is a flow chart and block diagram of various production methods for arsenic-resistant composite oxide catalysts.

Referring now to the figures of the drawing in detail and first, particularly, to FIG. 1 thereof, there is seen an overview of various production methods that lead to an arsenic-resistant composite oxide catalyst according to the invention. These various production methods can be divided into the following method steps, which will be described individually below and are to be performed in succession:
1. Mixing (1) of starting substances vanadium oxide (2) and molybdenum oxide (3);
2. Conversion of the mixture to the liquid phase by melting (4);
3. Cooling (6) and setting of the melt or $V_xMo_yO_{32}$ composite oxide phase;
4. Grinding (8) of the cooled-down composite oxide phase;
5. Reduction (10, 12, 14, 16) of the ground composite oxide phase. Four different reaction processes are alternatively possible for this purpose. They are gas reduction in a fixed bed (10), gas reduction in a fluidized bed (12), tempering (14) of the ground product at reduced pressure, and electroreduction (16) of the ground product.
6. Cooling down phase (20, 22, 24, 26) of the ground product following the reduction process being used;
7. Grinding (28) of the cooled-down, reduced composite oxide phase as needed;
8. Mixing (34) of the reduced composite oxide phase with a support (30);
9. Calcining ( 36 ) of the mixture.

Specifically,, vanadium oxide and molybdenum oxide are mixed together in step 1 in a ratio of 0.7 to 1. This mixture ratio is not exactly equivalent to the stoichiometric ratio of the composite oxide phase sought, but in the ensuing melting step 4 it produces the best results, because of the particular nature of the $V_2O_5/MoO_3$ system.

The oxygen-rich composite oxide phase $V_xMo_yO_{32}$ does not come without $V_2O_5$ until there are molar ratios of more than 58 mol-% of $MoO_3$ in the $V_2O_5/MoO_3$ mixture. In this range, increasingly large proportions of a $V_xMo_yO_{32}$ composite oxide phase can be expected as the $V_2O_5$ proportion increases.

As best understood from X-ray diffraction measurements on a single crystal formed of the $V_xMo_yO_{32}$ composite oxide phase, the stoichiometry of the material produced with the method is of the general formula $V_xMo_yO_8$ ($x+y=1$ or 0; x and y are integers). The oxygen atoms have been found to be disposed in octahedrons which are edge-linked and chain-linked at the edges. The heavy metal atoms vanadium or molybdenum are disposed on the inside of the octahedrons. It is also possible that some of the octahedrons are not occupied by a heavy metal atom. The number of octahedrons per elementary cell of the vanadium-molybdenum-composite-oxide is twelve. The general formula of the composite elementary cell with twelve octahedrons can therefore be given with $V_xMo_yO_{32}$; where $x+y\leq12$, $x\geq1$ and $y\geq1$.

It has been found that the most favorable working conditions exist in the range between 58 mol-% of $MoO_3$ and approximately 70 mol-% of $MoO_3$, in terms of both the complete melting of the mixture at the lowest possible temperatures and the maximum possible concentration of the $V_xMo_yO_{32}$ composite oxide phase to be formed. If work is done with a starting mixture of $V_2O_5$ to $MoO_3$ in a ratio of 0.7:1 in mol-%, then after the complete melting of the mixture in a range from 600° C. to 650° C. and cooling down as it drops below approximately 600° C., the desired $V_xMo_yO_{32}$ composite oxide phase forms, with only very slight proportions of an $MoO_3$ phase. The ensuing grinding of this solid oxide phase produces a powder which can be subjected to a gas reduction in either the fixed bed or the fluidized bed. It can be put in contact with a reducing gas at a temperature of from 400° C. to 590° C., and preferably approximately 430° C. It is best if the gas flows through the fixed bed or the fluidized bed reactor in the form of a circulating gas. Suitable examples of reducing gases are methane, carbon monoxide, hydrogen and hydrocarbon derivatives or aromatic compounds. During the reduction process there is no change in the composite oxide structure. But there can be created O-defects (oxygen) in the octahedrons by eliminating exposed oxygen atoms. These O-defects may be responsible for the higher catalytic activity. Arsenous oxide in the form of $As_2O_3$ can also be used for changing the $V_xMo_yO_{32}$ phase to the reduced $V_xMo_yO_{32}$ phase with O-defects. In this latter case, however, leaching or heating of the reduced $V_xMo_yO_{32}$ phase may later become necessary under some circumstances, in order to reduce arsenic residues. When put in contact with these above-mentioned substances the $V_xMo_yO_{32}$ phase is reduced to a reduced $V_xMo_yO_{32}$ phase containing O-defects. The speed of the reduction accelerates as the temperature increases.

As far as understood when the $V_xMo_yO_{32}$ composite oxide is treated with a reducing agent, a reduced material with the unchanged structure $V_xMo_yO_{32}$ results. The X-ray diffraction measurements do not differ between the unreduced $V_xMo_yO_{32}$ phase and the reduced $V_xMo_yO_{32}$ phase. What is different is a substantially increased catalytic activity of the reduced composite oxide as compared to the higher-oxygen $V_xMo_yO_{32}$ phase. This can be understood that some oxygen atoms are eliminated during reduction process and thus produce O-defects. The composite oxide resulting after the reduction treatment will in the following be referred to as reduced composite oxide or lower-oxygen composite oxide.

Unlike the situation when arsenous oxide is the reducing agent, it is simultaneously possible to jointly reduce the remaining $MoO_3$ phase as well, if methane, hydrogen, carbon monoxide and hydrocarbon derivatives are used as the reducing agents. This prevents the molybdenum oxide, in later operational use, from forming compounds of a type such as $As_4Mo_3O_{15}$ or $MoAs_2O_7$ with the arsenous oxide of the flue gas. At the same time, a lower rate of conversion of $SO_2$ to $SO_3$ is also attained. This conversion is highly undesirable, because the $SO_3$, together with the ammonia in the flue gas, forms ammonium sulfate $(NH_4)SO_4$ and ammonium hydrogen sulfate $NH_4HSO_4$, and if their temperature drops below the temperature of condensation but is above their melting temperature, these substances coat all of the fixtures disposed downstream in the course of the flue gas with a sticky composition.

However the reduction of the $V_xMo_yO_{32}$ phase can also be attained if this composite oxide phase is subjected to a high vacuum for several hours at temperatures between 400° C. and just below 600° C. Once again, a higher temperature produces an acceleration of the reaction, although an adequate margin from the melting point must be adhered to, in order to avoid a destruction of the composite oxide phase. Another option for reduction of the ground $V_xMo_yO_{32}$ phase is electroreduction.

In all of these cases, a composite oxide phase is obtained that leads to a more or less high proportion of the reduced $V_xMo_yO_{32}$ phase depending on the progress of the conversion. This reduced composite oxide phase can then be ground down to particle sizes of less than 180 μm, in the event that this fine particle size has not already been attained in the grinding step 8 prior to the reducing treatment. The adequately finely ground reduced $V_xMo_yO_{32}$ phase can then be mixed with the selected support material, such as titanium oxide, codierite or alumina. If titanium oxide is used, then the use of a titanium oxide having a BET surface area of 40 to 200 m²/g and a pore radius of substantially from 20 to 200 A, and preferably from 100 to 130 angstrom is recommended. In the ensuing calcination at 500° to 600° C., a catalytically active material having a pore radius of about 1000 angstrom units forms under process conditions, as the exemplary embodiment shows. More than 75% of the pores have a pore radius of over 200 angstrom units, and more than 70% of the pores have a pore radius of over 500 angstrom units.

In accordance with another feature of the invention, more than 70% of the pores may have a pore radius of from 200 to $10^4$ angstrom and more than 15% have a pore radius of over $10^3$ angstrom.

Figure 2:
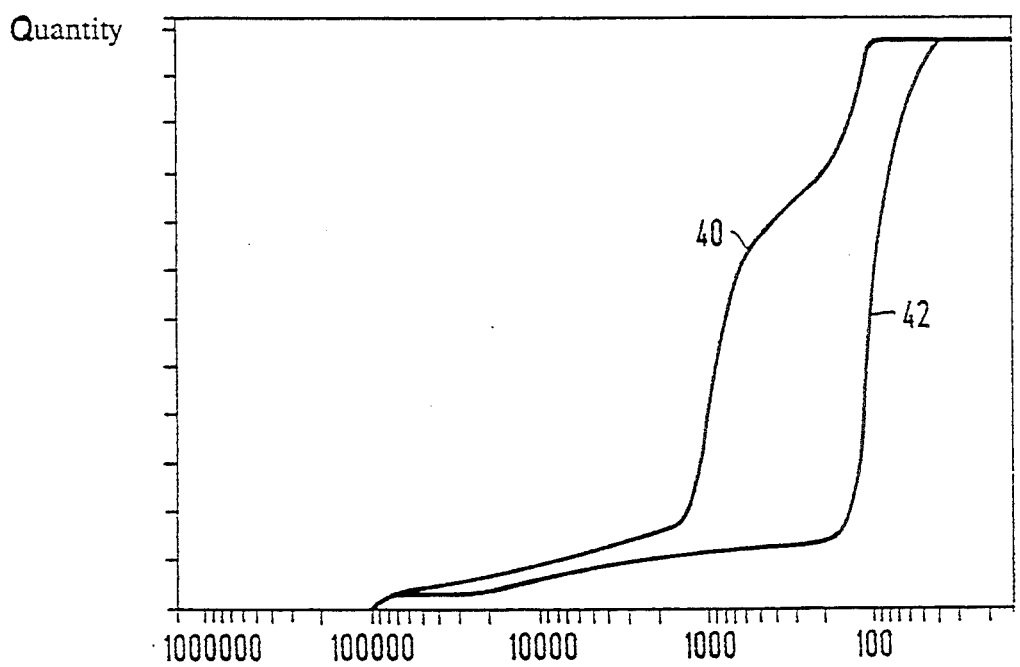
FIG. 2 is a diagram showing a comparison of a pore size in the catalyst according to the invention and in a prior art titanium-molybdenum catalyst in which the same titanium dioxide starting material was used.

In FIG. 2, a curve 40 shows this distribution of pore size in the finished arsenic-resistant catalyst according to the invention. For comparison, a curve 42 shows the proportion of the pore size in the catalyst according to the prior art. The point of interest in this comparison is that in both cases, the same $TiO_2$ support, having the same distribution of particle sizes and the same specific surface area, was used.

As FIG. 1 also shows, it is optionally possible to subject the resultant oxygen-rich $V_xMo_yO_{32}$ phase to both a gas reduction 50 and an electroreduction 52 while it is still in the molten state. In the gas reduction 50, the gas for reduction is blown through the melt. The same gases that are listed for gas reduction in the fixed and fluidized beds are suitable as reducing gases in this case. In electroreduction, an appropriate direct voltage is applied to two electrodes plunging into the melt. As cooling 54 and 56 occurs, the reduced $V_xMo_yO_{32}$ phase already solidifies out in both cases, along with residues of the oxygen-rich $V_xMo_yO_{32}$ phase and the $MoO_3$ phase. The product thus obtained must then be ground down to a particle range of less than 180 μm before it can be calcined, as already described, in a mixture with the desired support material at 500° to 600° C.

The arsenic-resistant reduced $V_xMo_yO_{32}$ phase on the oxidic support can be either applied to a metal vehicle, such as expanded sheet metal, corrugated sheet metal, metal trellis work, or extruded in the form of a honeycomb, and calcined. It is also possible for the reduced $V_xMo_yO_{32}$ phase applied to a support such as $TiO_2$, to then be applied to a macroscopic ceramic vehicle, such as swelling clay.

Materials were manufactured in accordance with the above-described process. The characterization of the material was done by means of single crystal investigations (X-ray structural analysis, Weissenberg method).

The following results were obtained:

| Symmetry | monoclinic |
|---|---|
| Space group | $P2_1/a$ |
| Lattice parameters | a: 19.3569 Å, b: 7.2582 Å, c: 4.1193 Å, β: 90.65° |

The structure comprises edge-linked double octahedron chains linked first into layers and then forming a three dimensional network of interconnected octahedron chains. The oxygen lattice in this structure appears very stable, vacancies in the octahedrons are occupied by molybdenum or vanadium. In addition to the statistical distribution of the metal atoms among the octahedrons, two stable locations are available to metal atoms within each octahedron. The table included in the Appendix gives the calculated diffraction angles (2 theta) and intensities determined from a powder data file for the lattice planes (hkl) derived from powder diffraction measurements.

As mentioned above the formula $V_xMo_yO_{32}$ of the higher and lower-oxygen phases is as best understood. The stoichiometry recited in the claims must be interpreted in light of the following diffraction data listed on pages 18-24.

APPENDIX

Peak list calculated by Guinier Simulation Program.
2*theta refers to wavelength CU KA = 1.54051Å

| 2*theta | Intensity | (HKL) |
|---|---|---|
| 13.02 | 0.01 | (1 1 0) |
| 15.25 | 0.24 | (2 1 0) |
| 18.32 | 47.95 | (4 0 0) |
| 18.38 | 0.02 | (3 1 0) |
| 21.56 | 97.86 | (0 0 1) |
| 22.06 | 0.21 | (4 1 0) |
| 23.35 | 5.75 | (−2 0 1) |
| 23.55 | 7.33 | (2 0 1) |
| 24.51 | 0.00 | (0 2 0) |
| 24.83 | 0.48 | (0 1 1) |
| 24.94 | 100.00 | (1 2 0) |
| 25.22 | 0.60 | (−1 1 1) |
| 25.31 | 0.46 | (1 1 1) |
| 26.07 | 0.01 | (5 1 0) |
| 26.20 | 0.00 | (2 2 0) |
| 26.42 | 0.52 | (−2 1 1) |
| 26.59 | 0.46 | (2 1 1) |
| 27.63 | 64.91 | (6 0 0) |
| 29.19 | 13.28 | (3 2 0) |
| 28.27 | 0.91 | (−4 0 1) |
| 28.35 | 0.47 | (−3 1 1) |
| 28.53 | 19.38 | (4 0 1) |
| 28.60 | 0.52 | (3 1 1) |
| 30.29 | 0.00 | (6 1 0) |
| 30.77 | 0.00 | (4 2 0) |

APPENDIX-continued

Peak list calculated by Guinier Simulation Program.
2*theta refers to wavelength CU KA = 1.54051Å

| 2*theta | Intensity | (HKL) |
|---|---|---|
| 30.88 | 0.35 | (−4 1 1) |
| 31.18 | 0.44 | (4 1 1) |
| 32.26 | 0.15 | (0 2 1) |
| 33.16 | 34.17 | (−1 2 1) |
| 33.23 | 0.13 | (1 2 1) |
| 33.83 | 43.29 | (5 2 0) |
| 33.90 | 0.33 | (−5 1 2) |
| 34.11 | 0.04 | (−2 2 1) |
| 34.24 | 0.29 | (5 1 1) |
| 34.25 | 0.07 | (2 2 1) |
| 34.69 | 0.00 | (7 1 0) |
| 35.11 | 13.17 | (−6 0 1) |
| 35.51 | 0.98 | (6 0 1) |
| 35.66 | 2.65 | (−3 2 1) |
| 35.86 | 0.05 | (3 2 1) |
| 37.13 | 2.66 | (8 0 0) |
| 37.26 | 0.00 | (6 2 0) |
| 37.29 | 0.33 | (−6 1 1) |
| 37.43 | 0.00 | (1 3 0) |
| 37.67 | 0.22 | (6 1 1) |
| 37.75 | 0.06 | (−4 2 1) |
| 38.01 | 0.00 | (4 2 1) |
| 38.31 | 0.00 | (2 3 0) |
| 39.22 | 0.03 | (8 1 0) |
| 39.76 | 0.00 | (3 3 0) |
| 40.32 | 0.04 | (−5 2 1) |
| 40.62 | 3.72 | (5 2 1) |
| 41.00 | 1.82 | (7 2 0) |
| 41.00 | 0.27 | (−7 1 1) |
| 41.41 | 0.22 | (7 1 1) |
| 41.70 | 0.03 | (4 3 0) |
| 43.11 | 0.11 | (−8 0 1) |
| 43.28 | 0.02 | (−6 2 1) |
| 43.34 | 0.14 | (0 3 1) |
| 43.56 | 0.18 | (8 0 1) |
| 43.57 | 0.20 | (−1 3 1) |
| 43.62 | 0.04 | (6 2 1) |
| 43.63 | 0.07 | (1 3 1) |
| 43.87 | 0.01 | (9 1 0) |
| 43.92 | 12.67 | (0 0 2) |
| 44.10 | 0.05 | (5 3 0) |
| 44.33 | 0.14 | (−2 3 1) |
| 44.44 | 0.11 | (2 3 1) |
| 44.85 | 1.79 | (−2 0 2) |
| 44.97 | 0.24 | (−8 1 1) |
| 44.99 | 0.00 | (8 2 0) |
| 45.07 | 2.88 | (2 0 2) |
| 45.40 | 0.23 | (8 1 1) |
| 45.58 | 0.18 | (−3 3 1) |
| 45.75 | 0.13 | (3 3 1) |
| 45.76 | 0.25 | (0 1 2) |
| 45.95 | 0.27 | (−1 1 2) |
| 46.06 | 0.25 | (1 1 2) |
| 46.60 | 6.15 | (−7 2 1) |
| 46.65 | 0.33 | (−2 1 2) |
| 46.87 | 0.27 | (2 1 2) |
| 46.90 | 23.75 | (10 0 0) |
| 46.90 | 0.02 | (6 3 0) |
| 46.97 | 0.90 | (7 2 1) |
| 47.31 | 0.11 | (−4 3 1) |
| 47.52 | 0.19 | (4 3 1) |
| 47.76 | 1.22 | (−4 0 2) |
| 47.84 | 0.26 | (−3 1 2) |
| 48.15 | 0.30 | (3 1 2) |
| 48.17 | 6.50 | (4 0 2) |
| 48.64 | 0.03 | (10 1 0) |
| 49.15 | 0.17 | (−9 1 1) |
| 49.20 | 0.00 | (9 2 0) |
| 49.47 | 0.16 | (−5 3 1) |
| 49.48 | 0.22 | (−4 1 2) |
| 49.61 | 0.20 | (9 1 1) |
| 49.72 | 0.12 | (5 3 1) |
| 49.88 | 0.27 | (4 1 2) |
| 50.05 | 0.00 | (7 3 0) |
| 50.21 | 0.06 | (−8 2 1) |
| 50.24 | 22.19 | (0 4 0) |
| 50.47 | 0.00 | (1 4 0) |
| 50.61 | 0.07 | (8 2 1) |

APPENDIX-continued

Peak list calculated by Guinier Simulation Program.
2*theta refers to wavelength CU KA = 1.54051Å

| 2*theta | Intensity | (HKL) |
|---|---|---|
| 50.94 | 0.10 | (0 2 2) |
| 51.12 | 13.59 | (−1 2 2) |
| 51.17 | 0.49 | (2 4 0) |
| 51.22 | 0.40 | (1 2 2) |
| 51.54 | 0.20 | (−5 1 2) |
| 51.77 | 0.05 | (−2 2 2) |
| 51.92 | 3.49 | (−10 0 1) |
| 51.97 | 0.02 | (2 2 2) |
| 52.02 | 0.12 | (−6 3 1) |
| 52.04 | 0.21 | (5 1 2) |
| 52.32 | 0.08 | (6 3 1) |
| 52.33 | 0.00 | (3 4 0) |
| 52.39 | 4.96 | (−6 0 2) |
| 52.41 | 10.41 | (10 0 1) |
| 52.87 | 1.32 | (−3 2 2) |
| 52.97 | 0.00 | (6 0 2) |
| 53.16 | 0.14 | (3 2 2) |
| 53.52 | 0.02 | (8 3 0) |
| 53.54 | 0.00 | (11 1 0) |
| 53.55 | 0.10 | (−10 1 1) |
| 53.62 | 0.00 | (10 2 0) |
| 53.92 | 3.34 | (4 4 0) |
| 54.00 | 0.20 | (−6 1 2) |
| 54.02 | 0.13 | (10 1 2) |
| 54.09 | 1.70 | (−9 2 1) |
| 54.40 | 0.00 | (−4 2 2) |
| 54.52 | 1.63 | (9 2 1) |
| 54.57 | 0.15 | (6 1 2) |
| 54.78 | 0.00 | (4 2 2) |
| 54.93 | 0.17 | (−7 3 1) |
| 55.26 | 1.10 | (7 3 1) |
| 55.27 | 12.47 | (0 4 1) |
| 55.47 | 0.07 | (−1 4 1) |
| 55.52 | 0.01 | (1 4 1) |
| 55.91 | 0.00 | (5 4 0) |
| 56.10 | 0.86 | (−2 4 1) |
| 56.20 | 1.04 | (2 4 1) |
| 56.33 | 0.03 | (−5 2 2) |
| 56.80 | 2.45 | (5 2 2) |
| 56.82 | 0.23 | (−7 1 2) |
| 56.05 | 1.72 | (12 0 0) |
| 57.17 | 0.03 | (−3 4 1) |
| 57.27 | 0.00 | (9 3 0) |
| 57.31 | 0.06 | (3 4 1) |
| 57.47 | 0.16 | (7 1 2) |
| 58.13 | 0.10 | (−11 1 1) |
| 58.17 | 0.10 | (−8 3 1) |
| 58.22 | 20.71 | (11 2 0) |
| 58.22 | 0.00 | (−10 2 1) |
| 58.29 | 11.65 | (6 4 0) |
| 58.47 | 0.06 | (−8 0 2) |
| 58.54 | 0.12 | (8 3 1) |
| 58.57 | 0.00 | (12 1 0) |
| 58.63 | 0.10 | (11 1 1) |
| 58.64 | 0.20 | (−4 4 1) |
| 58.66 | 0.05 | (−6 2 2) |
| 58.68 | 0.03 | (10 2 1) |
| 58.82 | 4.52 | (4 4 1) |
| 58.83 | 0.13 | (0 3 2) |
| 59.00 | 0.16 | (−1 3 2) |
| 59.09 | 0.14 | (1 3 2) |
| 59.19 | 0.11 | (8 0 2) |
| 59.20 | 0.03 | (6 2 2) |
| 59.59 | 0.14 | (−2 3 2) |
| 59.77 | 0.14 | (2 3 2) |
| 59.97 | 0.19 | (−8 1 2) |
| 60.52 | 0.02 | (−5 4 1) |
| 60.59 | 0.17 | (−3 3 2) |
| 60.68 | 0.17 | (8 1 2) |
| 60.74 | 0.04 | (5 4 1) |
| 60.86 | 0.16 | (3 3 2) |
| 61.03 | 0.01 | (7 4 0) |
| 61.28 | 0.00 | (10 3 0) |
| 61.33 | 4.01 | (−7 2 2) |
| 61.44 | 2.04 | (−12 0 1) |
| 61.72 | 0.07 | (−9 3 1) |
| 61.95 | 1.48 | (7 2 2) |
| 61.97 | 0.23 | (12 0 1) |
| 61.99 | 0.14 | (−4 3 2) |
| 62.11 | 0.12 | (9 3 1) |
| 62.34 | 0.14 | (4 3 2) |
| 62.58 | 6.89 | (−11 2 1) |
| 62.76 | 5.17 | (−6 4 1) |
| 62.90 | 0.14 | (−12 1 1) |
| 63.01 | 0.00 | (12 2 0) |
| 63.02 | 1.04 | (6 4 1) |
| 63.06 | 4.30 | (11 2 1) |
| 63.42 | 0.03 | (12 1 1) |
| 63.43 | 0.15 | (−9 1 2) |
| 63.76 | 0.00 | (13 1 0) |
| 63.79 | 0.11 | (−5 3 2) |
| 64.09 | 1.09 | (8 4 0) |
| 64.21 | 0.16 | (9 1 2) |
| 64.22 | 0.12 | (5 3 2) |
| 64.29 | 0.00 | (1 5 0) |
| 64.35 | 0.05 | (−8 2 2) |
| 64.90 | 0.00 | (2 5 0) |
| 65.04 | 0.07 | (8 2 2) |
| 65.36 | 0.01 | (−7 4 1) |
| 65.54 | 0.00 | (11 3 0) |
| 65.54 | 0.09 | (−10 3 1) |
| 65.66 | 0.00 | (7 4 1) |
| 65.78 | 0.30 | (−10 0 2) |
| 65.90 | 0.00 | (3 5 0) |
| 65.95 | 0.12 | (−6 3 2) |
| 65.97 | 0.04 | (10 3 1) |
| 66.46 | 0.11 | (6 3 2) |
| 66.62 | 4.59 | (10 0 2) |
| 67.17 | 0.00 | (−12 2 1) |
| 67.19 | 0.12 | (−10 1 2) |
| 67.28 | 0.00 | (4 5 0) |
| 67.48 | 0.00 | (9 4 0) |
| 67.68 | 0.00 | (12 2 1) |
| 67.69 | 1.76 | (−9 2 2) |
| 67.71 | 0.02 | (14 0 0) |
| 67.87 | 0.11 | (−13 1 1) |
| 68.00 | 0.81 | (13 2 0) |
| 68.02 | 0.12 | (10 1 2) |
| 68.25 | 0.06 | (0 0 3) |
| 68.30 | 0.05 | (−8 4 1) |
| 68.41 | 0.05 | (13 1 1) |
| 69.44 | 1.73 | (9 2 2) |
| 68.47 | 0.12 | (−7 3 2) |
| 68.47 | 0.05 | (0 5 1) |
| 68.64 | 0.12 | (8 4 1) |
| 68.65 | 0.06 | (−1 5 1) |
| 68.69 | 0.02 | (1 5 1) |
| 68.90 | 0.76 | (−2 0 3) |
| 63.91 | 3.97 | (0 4 2) |
| 69.04 | 0.01 | (5 5 0) |
| 69.05 | 0.10 | (7 3 2) |
| 69.06 | 0.00 | (−1 4 2) |
| 69.10 | 0.00 | (14 1 0) |
| 69.14 | 0.02 | (1 4 2) |
| 69.15 | 0.52 | (2 0 3) |
| 69.21 | 0.05 | (−2 5 1) |
| 69.29 | 0.05 | (2 5 1) |
| 69.60 | 0.75 | (−2 4 2) |
| 69.63 | 0.11 | (0 1 3) |
| 69.55 | 0.09 | (−11 3 1) |
| 69.76 | 0.14 | (−1 1 3) |
| 69.77 | 1.46 | (2 4 2) |
| 69.89 | 0.10 | (1 1 3) |
| 70.05 | 0.01 | (12 3 0) |
| 70.10 | 0.04 | (11 3 1) |
| 70.16 | 0.03 | (−3 5 1) |
| 70.28 | 0.05 | (3 5 1) |
| 70.28 | 0.12 | (−2 1 3) |
| 70.53 | 0.06 | (−3 4 2) |
| 70.53 | 0.12 | (2 1 3) |
| 70.77 | 0.04 | (3 4 2) |
| 71.10 | 1.43 | (−4 0 3) |
| 71.16 | 9.66 | (10 4 0) |
| 71.16 | 0.02 | (6 5 0) |
| 71.13 | 0.14 | (−3 1 3) |
| 71.22 | 0.11 | (−11 1 2) |

APPENDIX-continued

Peak list calculated by Guinier Simulation Program.
2*theta refers to wavelength CU KA = 1.54051Å

| 2*theta | Intensity | (HKL) |
|---|---|---|
| 71.32 | 0.12 | (−8 3 2) |
| 71.33 | 0.03 | (−10 2 2) |
| 71.48 | 0.03 | (−4 5 1) |
| 71.55 | 0.13 | (3 1 3) |
| 71.57 | 0.00 | (−9 4 1) |
| 71.59 | 0.64 | (4 0 3) |
| 71.64 | 0.06 | (4 5 1) |
| 71.70 | 0.17 | (−14 0 1) |
| 71.83 | 0.78 | (−4 4 2) |
| 71.94 | 0.00 | (9 4 1) |
| 71.98 | 0.11 | (8 3 2) |
| 72.00 | 0.06 | (−13 2 1) |
| 72.12 | 0.13 | (11 1 2) |
| 72.14 | 0.03 | (10 2 2) |
| 72.15 | 3.09 | (4 4 2)· |
| 72.27 | 0.14 | (14 0 1) |
| 72.46 | 0.11 | (−4 1 3) |
| 72.52 | 0.61 | (13 2 1) |
| 72.94 | 0.09 | (4 1 3) |
| 69.76 | 0.14 | (−1 1 3) |
| 73.05 | 0.05 | (−14 1 1) |
| 73.17 | 0.02 | (−5 5 1) |
| 73.19 | 0.00 | (14 2 0) |
| 73.38 | 0.03 | (5 5 1) |
| 73.50 | 0.02 | (−5 4 2) |
| 73.62 | 0.04 | (14 1 1) |
| 73.64 | 0.00 | (7 5 0) |
| 73.71 | 0.03 | (0 2 3) |
| 73.84 | 0.69 | (−1 2 3) |
| 73.90 | 0.03 | (5 4 2) |
| 73.96 | 2.73 | (1 2 3) |
| 74.02 | 0.07 | (−12 3 1) |
| 74.10 | 0.09 | (−5 1 3) |
| 74.20 | 1.51 | (−12 0 2) |
| 74.35 | 0.02 | (−2 2 3) |
| 74.50 | 0.01 | (12 3 1) |
| 74.51 | 0.10 | (−9 3 2) |
| 74.59 | 0.03 | (2 2 3) |
| 74.64 | 0.00 | (15 1 0) |
| 74.70 | 0.09 | (5 1 3) |
| 74.77 | 0.00 | (−6 0 3) |
| 74.81 | 0.00 | (13 3 0) |
| 75.14 | 0.01 | (11 4 0) |
| 75.15 | 2.10 | (−10 4 1) |
| 75.16 | 0.32 | (12 0 2) |
| 75.23 | 0.00 | (−3 2 3) |
| 75.23 | 0.07 | (−6 5 1) |
| 75.23 | 0.11 | (9 1 2) |
| 75.27 | 2.75 | (−11 2 2) |
| 75.47 | 0.01 | (6 5 1) |
| 75.49 | 1.31 | (6 0 3) |
| 75.53 | 2.63 | (−6 4 2) |
| 75.64 | 0.10 | (−12 1 2) |
| 75.55 | 5.91 | (10 4 1) |
| 75.59 | 0.61 | (3 2 3) |
| 76.01 | 0.00 | (6 4 2) |
| 76.11 | 0.09 | (−6 1 3) |
| 76.14 | 0.84 | (11 2 2) |
| 76.46 | 0.00 | (8 5 0) |
| 76.48 | 0.00 | (−4 2 3) |
| 76.49 | 0.06 | (12 1 2) |
| 76.82 | 0.09 | (6 1 3) |
| 76.95 | 0.01 | (4 2 3) |
| 77.06 | 0.03 | (−14 2 1) |
| 77.62 | 0.01 | (14 2 1) |
| 77.64 | 0.06 | (−7 5 1) |
| 77.91 | 0.04 | (7 5 1) |
| 77.91 | 0.01 | (−7 4 2) |
| 78.02 | 0.10 | (−10 3 2) |
| 78.09 | 3.06 | (−5 2 3) |
| 78.46 | 0.04 | (−15 1 1) |
| 78.47 | 0.00 | (7 4 2) |
| 78.47 | 0.11 | (−7 1 3) |
| 78.62 | 0.60 | (15 2 0) |
| 78.67 | 0.08 | (−13 3 1) |
| 78.68 | 0.51 | (5 2 3) |
| 78.81 | 0.11 | (10 3 2) |
| 79.04 | 0.04 | (−11 4 1) |
| 79.06 | 0.03 | (15 1 1) |
| 79.09 | 2.71 | (16 0 0) |
| 79.10 | 0.01 | (0 6 0) |
| 79.18 | 0.02 | (13 3 1) |
| 79.28 | 2.21 | (1 6 0) |
| 79.79 | 0.09 | (7 1 3) |
| 79.42 | 1.03 | (12 4 0) |
| 79.47 | 0.03 | (11 4 1) |
| 79.50 | 0.00 | (−12 2 2) |
| 79.61 | 0.00 | (9 5 0) |
| 79.83 | 0.01 | (14 3 0) |
| 79.84 | 0.00 | (2 6 0) |
| 79.97 | 0.07 | (−8 0 3) |

I claim:

1. A method of reducing nitrogen oxides in flue gases in the presence of a reducing agent, which comprises exposing the flue gases to an arsenic-resistant catalyst including vanadium and molybdenum in an oxygen lattice with a relatively lower-oxygen phase obtained by reducing a relatively higher-oxygen phase with a general formula $V_xMo_yO_{32}$ and a given structure, where $x+y \leq 12$ and where $x \geq 1$ and $y \geq 1$, and the relatively lower-oxygen phase has the given structure.

2. The method according to claim 1, which comprises selecting the reducing agent from the group consisting of ammonia and carbon monoxide.

3. The method according to claim 1, which comprises exposing an arsenic-resistant catalyst with a partly reduced molybdenum oxide phase in the exposing step.

4. A method of catalytically reducing nitrogen oxides in flue gases, which comprises enriching the flue gases with a reducing agent and exposing the enriched flue gases to an arsenic-resistant catalyst including vanadium and molybdenum in an oxygen lattice having at least one relatively lower-oxygen phase obtained by reducing a relatively higher-oxygen phase with a general formula $V_xMo_yO_{32}$ where $x+y \leq 12$ and where $x \geq 1$ and $y \geq 1$, and a partly reduced molybdenum oxide phase.

5. The method according to claim 4, which comprises enriching the flue gases with ammonia or carbon monoxide in the enriching step.

6. The method according to claim 4, which comprises moving the flue gases past an arsenic-resistant catalyst having an oxidic support for the phases with at least one material selected from the group consisting of titanium oxide, cordierite, alumina and silica.

* * * * *